United States Patent [19]
Joseph

[11] Patent Number: 6,052,275
[45] Date of Patent: Apr. 18, 2000

[54] MULTIMEDIA MONITOR TESTING APPARATUS AND METHOD

[75] Inventor: Jack B. Joseph, Austin, Tex.

[73] Assignee: Dell USA L.P., Round Rock, Tex.

[21] Appl. No.: 09/181,489

[22] Filed: Oct. 28, 1998

[51] Int. Cl.[7] .............................. H05K 5/00; H05K 5/02; G06F 1/16
[52] U.S. Cl. ......................... 361/683; 361/681; 361/682; 361/727; 381/386; 381/387; 345/905; 248/917
[58] Field of Search ..................................... 361/683, 681, 361/682, 686, 724–727; 364/708.1; 353/119, 120, 122; 345/169, 905; 248/917; 381/87, 88, 309, 388, 386, 387

[56] References Cited

U.S. PATENT DOCUMENTS

| | | | |
|---|---|---|---|
| D. 355,413 | 2/1995 | Masunari | D14/113 |
| 4,175,672 | 11/1979 | Moser | 220/334 |
| 4,729,614 | 3/1988 | Nadler et al. | 312/292 |
| 4,914,265 | 4/1990 | Mongeau | 200/330 |
| 5,224,869 | 7/1993 | Lee | 439/136 |
| 5,291,559 | 3/1994 | Freadman | 381/188 |
| 5,400,408 | 3/1995 | Lundgren et al. | 381/88 |
| 5,448,647 | 9/1995 | Koizumi | 381/90 |
| 5,519,572 | 5/1996 | Luo | 361/685 |
| 5,553,149 | 9/1996 | Freadman | 381/24 |
| 5,587,876 | 12/1996 | O'Brien et al. | 361/682 |
| 5,623,391 | 4/1997 | Chase et al. | 361/681 |
| 5,666,263 | 9/1997 | Mundt et al. | 361/683 |
| 5,668,882 | 9/1997 | Hickman et al. | 381/24 |
| 5,675,426 | 10/1997 | Meinser et al. | 358/838 |
| 5,677,961 | 10/1997 | von Reusner | 381/90 |
| 5,696,814 | 12/1997 | Tran et al. | 379/110 |
| 5,701,347 | 12/1997 | Daniels et al. | 381/24 |
| 5,825,614 | 10/1998 | Kim | 361/683 |
| 5,838,537 | 11/1998 | Lundgren et al. | 361/683 |
| 5,852,545 | 12/1998 | Pan-Ratzlaff | 361/683 |
| 5,880,928 | 3/1999 | Ma | 361/683 |

FOREIGN PATENT DOCUMENTS 408234866A 9/1996 Japan ................. G06F 1/16

*Primary Examiner*—Leo P. Picard
*Assistant Examiner*—Anatoly Vortman
*Attorney, Agent, or Firm*—Skjerven, Morrill, MacPherson, Franklin & Friel, L.L.P.; Joseph T. Van Leeuwen

[57] ABSTRACT

A multimedia computer monitor simplifying testing and repair includes cavities within the multimedia computer monitor for insertion of speakers. The speakers are interchangeable so that the first speaker can be inserted in the second cavity and the second speaker can be inserted in the first cavity. The multimedia computer monitor may include test buttons for sending audible signals to the first and second speakers. A method of testing the speakers includes interchanging the speakers within the cavities and listening for an audible response. A test signal to generate the audible response can be provided by test buttons within the multimedia computer monitor so that the test signal may be generated without connecting the multimedia computer monitor to a computer system. A method of testing the multimedia computer monitor isolates a defect to the first speaker, the second speaker, or the multimedia computer monitor.

20 Claims, 6 Drawing Sheets

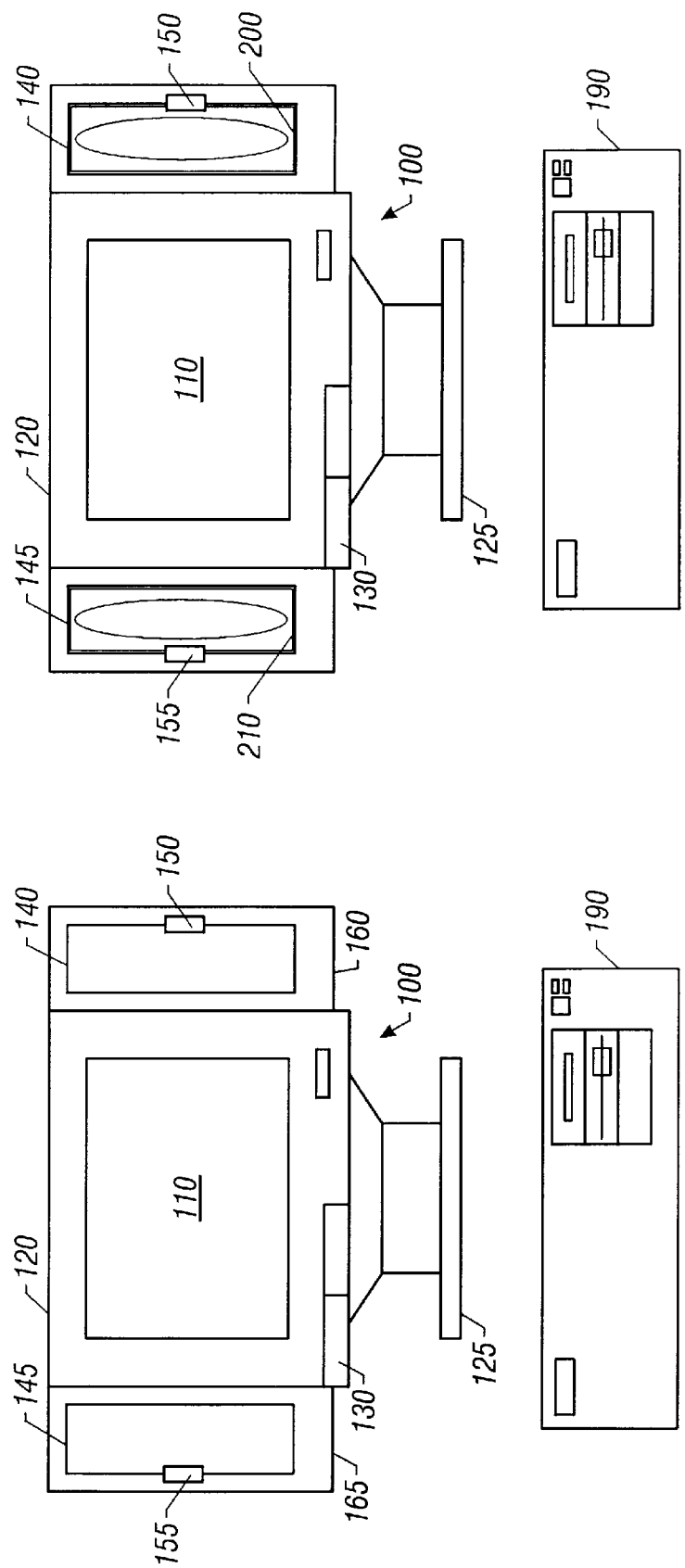

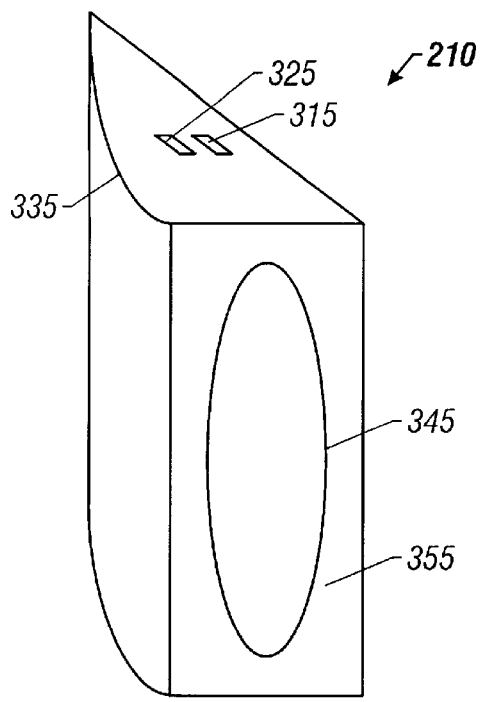 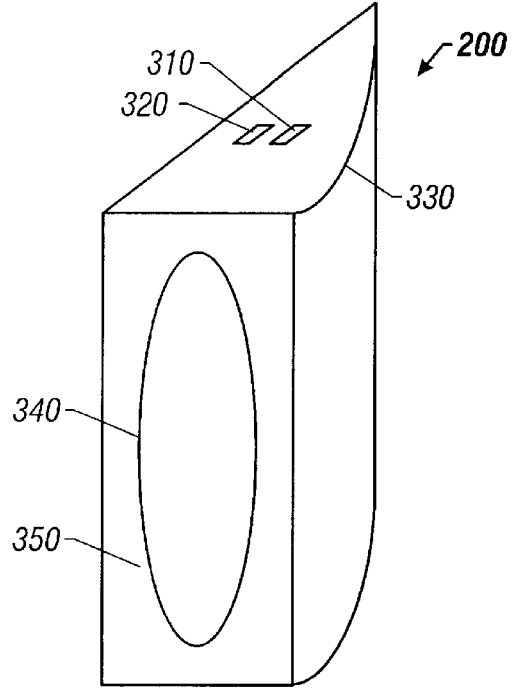
FIG. 3A   FIG. 3B
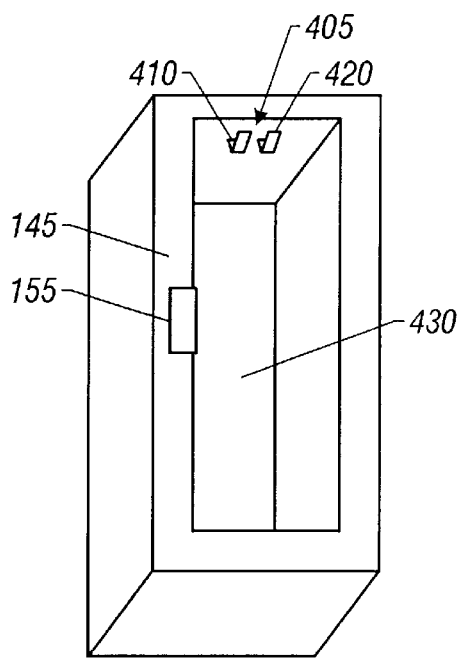
FIG. 4

MULTIMEDIA MONITOR TESTING APPARATUS AND METHOD

BACKGROUND

1. Field

This field relates to multimedia computer monitors and diagnostic tests therefor.

2. Description of the Related Art

Computer systems in general and International Business Machines (IBM) compatible personal computer systems in particular have attained widespread use for providing computer power to many segments of today's modern society. A personal computer system can usually be defined as a desk top, floor standing, or portable microcomputer that includes a system unit having a system processor and associated volatile and non-volatile memory, a display monitor, a keyboard, one or more diskette drives, a fixed disk storage device and an optional printer. One of the distinguishing characteristics of these systems is the use of a system board to electrically connect these components together. These personal computer systems are information handling systems which are designed primarily to give independent computing power to a single user (or a relatively small group of users in the case of personal computers which serve as computer server systems) and are inexpensively priced for purchase by individuals or small businesses. A personal computer system may also include one or a plurality of I/O devices (i.e. peripheral devices) which are coupled to the system processor and which perform specialized functions. Examples of I/O devices include modems, sound and video devices or specialized communication devices. Mass storage devices such as hard disks, CD-ROM drives and magneto-optical drives are also considered to be peripheral devices. Computers producing multimedia effects (e.g., sound coupled with visual images) are in increased demand as computers are used for artistic endeavors, for entertainment, and for education. Sound makes game playing more realistic and helps reinforce knowledge and make educational programs more enjoyable to use. Digital effects and music can also be created on the computer and played through attached speakers without the need for additional musical instruments or components.

Multimedia systems today often include audio speakers along with monitors. For various reasons, including size constraints and speaker positioning, many computer users prefer having speakers included with their monitors. Manufacturers, therefore, offer multimedia monitors which include a display screen, (i.e., cathode ray tube or "CRT") and integrated speakers. These speakers are usually mounted on the side of the monitor or housed within cavities along the perimeter of the monitor. Speakers are often mounted on the left and right sides of the video screen and may also be mounted on top or underneath the video screen as well. The multimedia monitor generally contains a power cord to receive standard (110 volt) power as well as cables to connect the audio and video capabilities of the multimedia monitor to the computer system. These cables generally include a 9 pin video connector for connecting to the computer system's video card and a left and right standard audio cables to connect to the audio jacks on the sound card within the computer system.

A challenge of multimedia monitors is diagnosing problems the computer user may encounter and repairing the unit when a hardware problem is suspected. Multimedia monitors are often larger than other monitors because of the added volume and weight of the speakers. A multimedia monitor often weighs 50 pounds or more, generally depending on the size of the video screen. Furthermore, video screen sizes demanded by users are becoming larger and larger as the price for larger screens continues to drop, which, in turn, adds further weight and bulk to multimedia monitors. While the individual speakers themselves may be relatively small and light in comparison with the entire unit, the entire unit must often be returned for repair. Users currently return the entire unit to the manufacturer or repair center, even if the repair is specifically directed at one of the speakers. In addition, if the user has to send the multimedia monitor in for repairs, the computer system is often useless until the multimedia monitor is returned, even if the repairs are only directed at the speakers.

Multimedia monitors pose challenges for manufacturers and service organizations as well. First, it is often difficult to diagnose whether the problem is hardware or software related. Operating systems, such as Windows 95™, often have software that controls the volume or mute condition of the audio system. A user may not realize that the speaker volume control has been muted and may therefore assume that a hardware problem exists. In addition, this same software controls the balance of the speaker to determine, for example, how much volume is sent out of the right and left speakers. If the balance has been set to send all the volume out of one of the two speakers, the user may assume that the other speaker is broken. In order to diagnose many multimedia monitor reports, technical support personnel have to ask the user many questions about the software and various settings in the operating system controls in order to rule out software settings as a possible problem.

An improvement to multimedia monitors is needed to diagnose problems that are reported and to have the user return only those components within the multimedia monitor that are needed to be repaired.

SUMMARY

A multimedia computer monitor of the present invention has the advantages of simplifying the testing and repair of the monitor in the field. The present invention provides cavities within the multimedia computer monitor for insertion of speakers. The speakers are interchangeable so that the left speaker can be inserted in the right cavity and the right speaker can be inserted in the left cavity. The present invention provides a method for determining if a defect lies within an individual speaker or within the multimedia computer monitor. By testing each speaker in each of the cavities, defects are isolated as being within a particular speaker or within the multimedia computer monitor itself. The present invention further provides test buttons responsive to a user's touch which provide an audio signal to the speakers without use of an attached computer system and without reliance on operating system software to send audio signals to the speakers.

BRIEF DESCRIPTION OF THE DRAWINGS

The present invention may be better understood, and its numerous objects, features, and advantages made apparent to those skilled in the art by referencing the accompanying drawings.

FIG. 1 is a front view of a multimedia monitor with speakers removed.

FIG. 2 is a front view of a multimedia monitor with speakers.

FIG. 3a is a perspective view of a left speaker.

FIG. 3b is a perspective view of a right speaker.

FIG. 4 is a perspective view of a multimedia cavity.

The use of the same reference symbols in different drawings indicates similar or identical items.

DESCRIPTION OF THE PREFERRED EMBODIMENT(S)

Figure 5A:
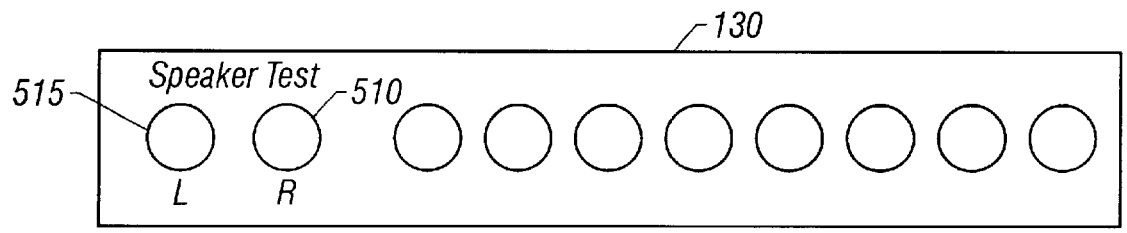
FIG. 5a is a front view of a multimedia monitor control panel.

FIG. 1 shows a front view of multimedia monitor 100 without speakers. Multimedia monitor 100 includes display screen 110 for displaying information generated by a connected computer to the end user. Multimedia monitor 100 also includes a monitor frame 120 for framing display screen 110 and for supporting other components of multimedia monitor 100. Pedestal 125 supports multimedia monitor 100 and preferably allows multimedia monitor 100 to swivel and rotate. Control panel 130 contains buttons for adjusting and testing display screen 110. Right cavity frame 140 provides an enclosure for a speaker to be inserted within multimedia monitor 100 by sliding the speaker within the cavity formed by right cavity frame 140 and securing with latch 150. Similarly, left cavity frame 145 provides a corresponding enclosure for another speaker to be inserted on the left side of display screen 110. Again, left cavity frame 145 forms a cavity into which a speaker is inserted and secured using latch 155. Multimedia monitor 100 is connected to computer system 190 through cables. Computer system 190 includes nonvolatile storage device (i.e., a hard drive), memory, a processor, and a power supply (all not shown). For multimedia purposes, computer system 190 also includes a PC audio card and a graphics display card, both connected to the system board of computer system 190. As will be appreciated by those skilled in the art, computer system 190 could be a desktop unit, a tower unit, or a notebook style computer. As will also be appreciated by those skilled in the art, multimedia monitor 100 could be a desktop style unit (as shown) or could be a flip-up notebook style display (see FIG. 9) or a flat-panel display (see FIG. 8).

Turning now to FIG. 2, a front view of multimedia monitor 100 is shown with speakers. Right speaker 200 is shown after having been inserted into multimedia monitor 100 in the cavity formed by right cavity frame 140 and secured by latch 150. Similarly, left speaker 210 is shown after having been inserted into multimedia monitor 100 in the cavity formed by left cavity frame 145 and secured in place by latch 155.

FIGS. 3a and 3b show perspective views of a left and right speaker, respectively. FIG. 3a shows left speaker 210 removed from multimedia monitor 100. Left electrical contact 325 and right electrical contact 315 are shown on top of left speaker 210. These contacts engage with corresponding contacts in multimedia monitor 100 to electrically connect left speaker 210 to multimedia monitor 100. As shown, contacts 315 and 325 would press against corresponding contacts in multimedia monitor 100 when speaker 210 is slid into the cavity on the left side of display screen 110. These electrical contacts 315 and 325 can be metal contact plates located on any side of the left speaker 210 or can be plug and socket type connectors for connecting a corresponding plug or socket from multimedia monitor 100. Left side 335 of left speaker 210 is shown as being curved, however, it will be appreciated that a variety of shapes are possible for left speaker 210 and right speaker 200. The sound is emanated through a left speaker cone 345. More than one cone may be formed within the face 355 of left speaker 210. As is known in the art, these cones may be woofers, tweeters, or bass, or combinations of the above. Speaker face 355 may be covered by a decorative grill (not shown) made of fabric or mesh to hide the components formed on face 355.

FIG. 3b shows right speaker 200 with left electrical contact 320 and right electrical contact 310 on top of the speaker. In a preferred embodiment, left and right speaker contacts 320 and 310 are positioned on right speaker 200 in the same way left and right speaker contacts 325 and 315 are positioned on left speaker 210. Furthermore, the left contact is kept on the same side of the right contact in each speaker to allow the speakers to be interchanged. Therefore, if right speaker 200 was placed in left cavity frame 145, contact 320 would align and contact with the corresponding left contact in the cavity formed by left cavity frame 145 and contact 310 would align and contact with the corresponding right contact in the cavity formed by frame 145. Right side 330 of right speaker 200 is shown as being curved to direct sound emanating from the right speaker to a user positioned in front of multimedia monitor 100. The sound is emanated through a right speaker cone 340. More than one cone may be formed within the face 350 of right speaker 200. The same speaker components (woofers, tweeters, basses) can be formed within face 350 of right speaker 200 as were described for left speaker 210 above. Speaker face 350 may be covered by a decorative grill (not shown) made of fabric or mesh to hide the components formed on face 355. In addition, multimedia monitor 100 may be sold with moderate quality speakers. After purchasing multimedia monitor 100, a user can upgrade the sound quality produced by multimedia monitor 100 by simply replacing the speakers rather than the entire multimedia monitor.

Turning now to FIG. 4, a perspective drawing of left speaker compartment 165 within multimedia monitor 100 is shown. Left cavity frame 145 is shown forming left speaker cavity 175. On the ceiling of left speaker cavity 175 are a pair of contacts. Cavity contacts 405 include left contact 410 and right contact 420. Left contact 410 is positioned to engage with either left speaker contact 325 of the left speaker 210 or left speaker contact 320 of the right speaker 200 depending upon which speaker is slid into left speaker cavity 175 and secured with latch 155. Likewise, right contact 420 is positioned to engage with either right speaker contact 315 of the left speaker 210 or right speaker contact 310 of the right speaker 200 depending upon which speaker is slid into left speaker cavity 175 and secured with latch 155. Making the left and right speakers interchangeable and removable by the user is advantageous for providing the user with service. If the user calls for technical support due to a multimedia speaker problem, the problem can be diagnosed and remedied much easier if the left and right speakers are interchangeable. For example, if sound is not coming out of the left speaker, the user can remove the speakers and put the right speaker in the left speaker cavity. If the right speaker works in the left speaker cavity, it is likely that the left speaker unit needs to be repaired. The left speaker can then be sent to a repair shop or manufacturer for repair and the user can retain and use the rest of the multimedia monitor 100 while repairs are taking place.

Figure 5B:
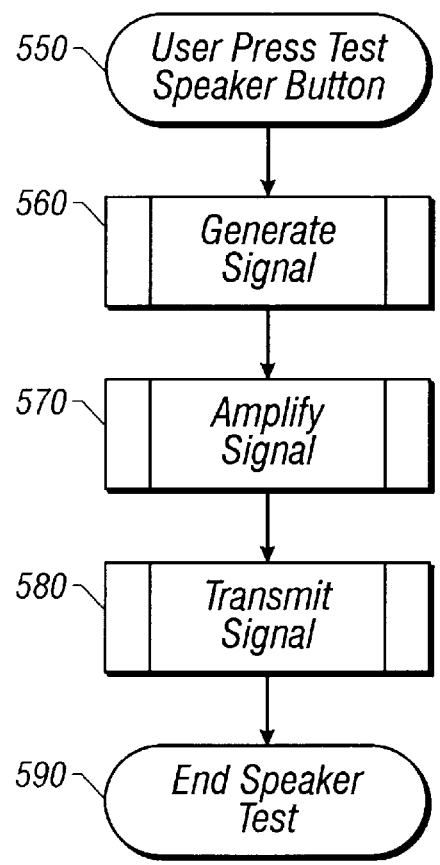
FIG. 5b is a block diagram for a speaker test.

Using a conventional multimedia monitor, the user and technician would have to rely on a properly attached computer system 190 running software that would produce sounds for the user to hear. Audio control software often has controls to control whether the sound is muted and the balance between the left and right speaker. These control settings are often saved and reused upon a subsequent invocation of the operating system. If someone had previously muted the sound or adjusted the balance between the speakers, the user might not know why sound was not coming out of the speakers or why one speaker was louder than the other. An unnecessary call to a computer technician might be made in order to simply figure out that the sound controls had been altered. FIG. 5a shows control panel 130 from the front of multimedia monitor 100. Control panel 130 includes two speaker test buttons, right speaker test button 510 and left speaker test button 515. As used herein, button includes switches, buttons, sliding control levers, toggles, and the like. In order to test left speaker 210, the user would press left speaker test button 515. Circuitry inside multimedia monitor 100, responsive to such an event, would operate to produce an audible test signal from left speaker 210. Likewise, circuitry inside multimedia monitor 100 would also be responsive to the user pressing right speaker test button 510 and produce an audible test signal from right speaker 220. FIG. 5b is a block diagram of the basic circuitry contained within multimedia monitor 100 for producing audible test signals. When the user presses a test speaker button 550, power is supplied to the circuitry to generate signal 560. Generate signal 560 circuitry can produce a variety of audio signals, either fixed tone or multi-tone, as is appreciated by those skilled in the art. A multi-tone signal would be able to help diagnose whether the speaker has difficulty producing only certain tones. After the generate signal 560 circuitry has produced the test signal, the signal can be amplified by amplify signal 570 circuitry to an audible volume for transmission to the speaker by means appreciated by those skilled in the art. Finally, the amplified signal is transmitted to the corresponding speaker by transmit signal 580 circuitry, again as appreciated by those skilled in the art. Finally, the speaker test is ended at end speaker test 590.

Using the left speaker test button 515 and right speaker test button 510 in conjunction with the circuitry in FIG. 5, would allow the user or technician to diagnose a possible speaker problem without even connecting to computer system 190. For example, if a user believes that they are having a problem with both speakers because no sound is coming out while executing a multimedia computer software program, the user can simply reach up and press the right speaker test button 510 and the left speaker test button 515. If sound comes out of the speakers, the user can rule out a problem with the physical speakers. In addition, if the transmit signal 580 path used the same path as signals normally travel through multimedia monitor 100, then most possible hardware problems with multimedia monitor 100 could also be ruled out. The user could then investigate the audio control software settings in the operating system to see if the sound has been muted and could check the cables to ensure that the multimedia monitor 100 is properly connected to computer system 190. In similar fashion, the user could diagnose problems with one speaker being louder than the other speaker. If the test signals produced when the user presses left speaker test button 515 and right speaker test button 515 are the same volume, the user can again be assured that the problem likely lies away from the physical speakers.

Referring back to FIG. 2, if sound comes out of only one speaker, the interchangeable speaker aspect of multimedia monitor 100 can be used to further diagnose the problem in conjunction with control panel 130. For example, if the user notices that no sound is coming from left speaker 210, the user can first press the left speaker test button 515. If still no sound comes out of left speaker 210 in response to the test, the user can determine that a hardware problem likely exists with multimedia monitor 100. Now the user needs to determine if the likely problem is with the individual speaker or with components within multimedia monitor 100. To do this, the user removes left speaker 210 and right speaker 200 from respective left speaker cavity 175 and right speaker cavity 170. The user then places left speaker 210 into right speaker cavity 170 and right speaker 200 into left speaker cavity 175. Now when user presses right speaker test button 510 sound should emanate from left speaker 210 which is now located in right speaker cavity 170. If no sound occurs, the user is likely experiencing a hardware problem with left speaker 210 and can return this speaker for repairs. However, if sound occurs from left speaker 210 which is located in right speaker cavity 170, but no sound occurs from right speaker 200 (which has been placed in left speaker cavity 175), the user likely has two good speakers but a short or other hardware problem with multimedia monitor 100. This diagnosis process, either done by the user or with a technician, helps determine which of the components within multimedia monitor 100 need to be repaired. If the user only has to send back one of the speakers, the user can still use multimedia monitor 100 with the other speaker and can still use display screen 110 to interact with computer system 190. This eliminates unnecessary down time of computer system 190 and reduces the shipping costs associated with shipping a large multimedia monitor 100 rather than shipping a much smaller and lighter speaker.

Figure 6:
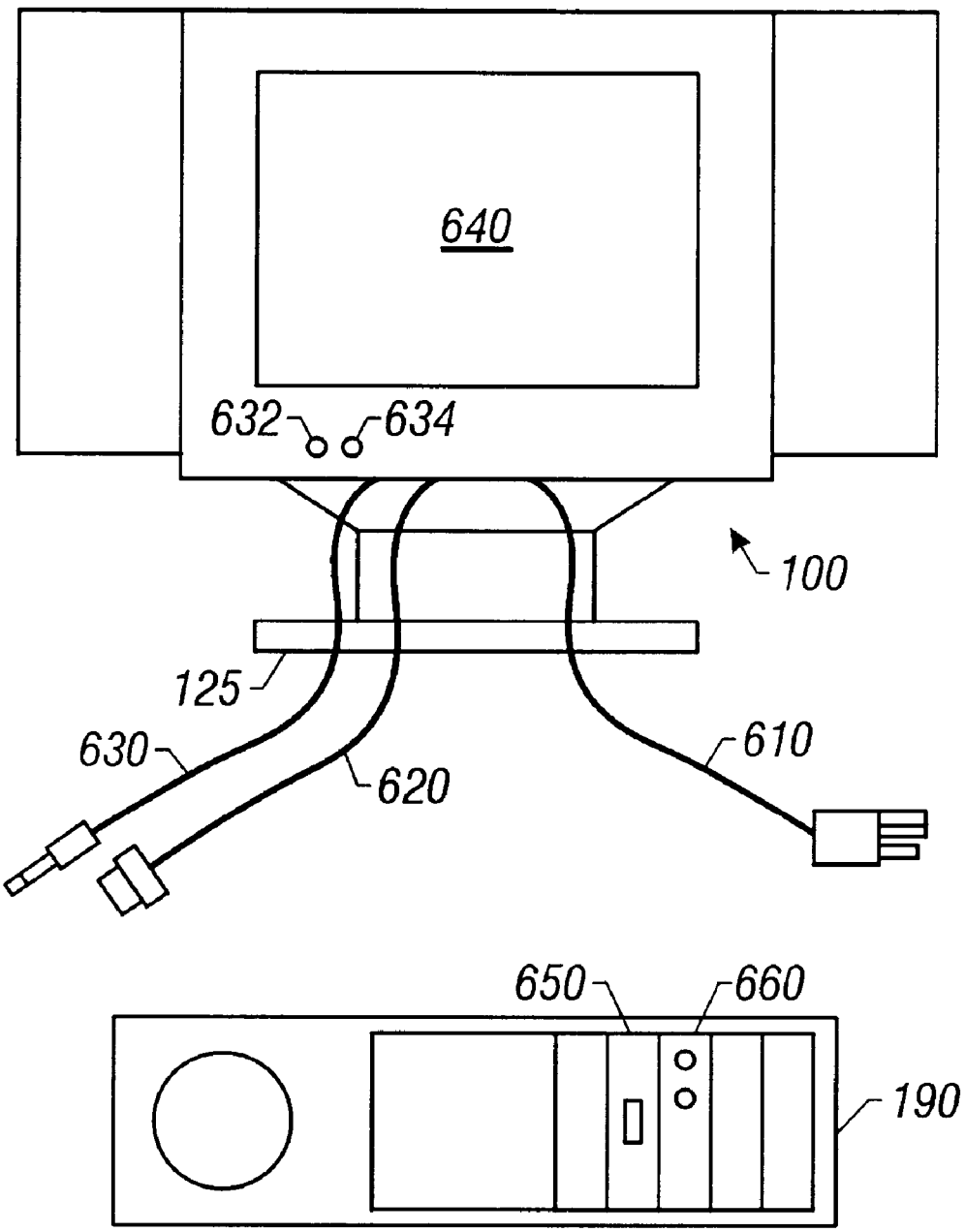
FIG. 6 is a rear view of a multimedia monitor.

FIG. 6 shows a rear view of multimedia monitor 100 and computer system 190. Power cord 610 provides power to multimedia monitor 100 and (if necessary) left speaker 210 and right speaker 200 (not shown). Display screen 110 is connected to computer system 190 through video cable 620. The video cable may connect to graphic card 650 which in turn is connected to the system board (not shown) of computer system 190 as is appreciated by those skilled in the art. The audio capabilities (i.e., left speaker 210 and right speaker 200) of multimedia monitor 100 are connected to computer system 190 through audio cable 630 which the connects sound card output port on computer system 190 to left input port 632 and right input port 634, both of which are located on the back of multimedia monitor 100. As will be appreciated by those skilled in the art, although two input ports are shown for simplicity, the ports could be combined and connected using a jack connected to audio cable 630 which provides multiple (left and right) conductors (not shown). PC sound card 660 may be used to connect audio cable 630 to computer system 190.

Figure 7:
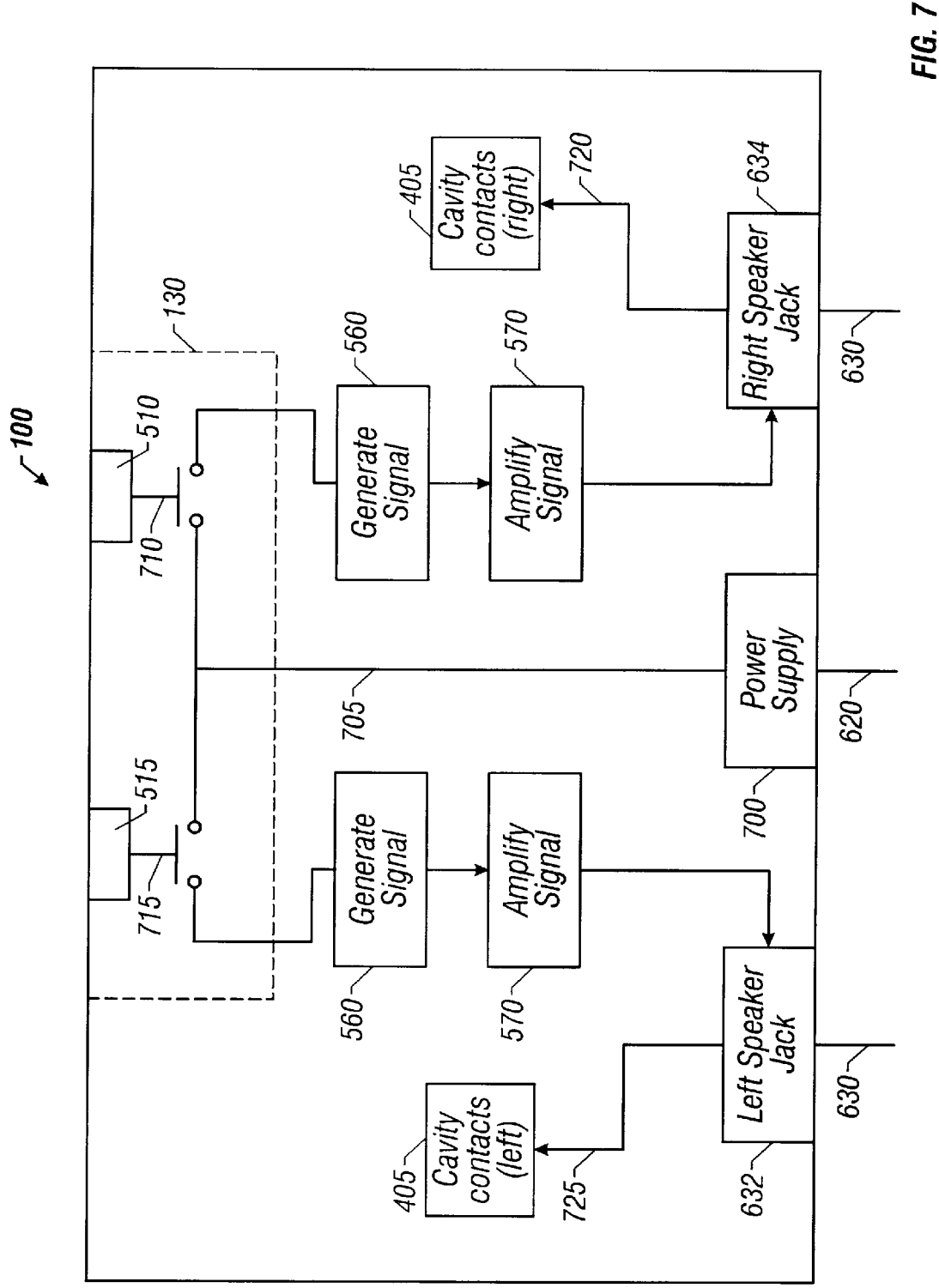
FIG. 7 is a block diagram depicting components and circuitry for providing the audio functionality of a multimedia monitor.

FIG. 7 depicts a block diagram of the audio portions of multimedia monitor 100. Power is supplied to power supply 700 of multimedia monitor 100 through power cord 620 for distribution within multimedia monitor 100. Power conductor 705 provides power to left switch 715 and right switch 710 from power supply 100. As is known in the art, power supply 700 converts standard voltage and amperage provided by an outlet to the voltage and amperage needed by components within multimedia monitor 100. Left switch 715 is responsive to a user pressing left speaker test button 515. Left switch 715 can be a normally open or closed switch depending on the circuitry chosen to provide a test audio signal to test speakers within multimedia monitor 100. Left switch 715 is shown as being pushbutton make switch which completes the circuit when pressed. When a user presses left switch 715, the switch provides power to generate signal 560 circuitry. Generate signal 560 circuitry can produce a variety of audio signals, either fixed tone or multi-tone, as is appreciated by those skilled in the art. After the audio signal is generated, the signal can be amplified by amplify signal 570 circuitry to an audible volume for transmission to the speaker by means appreciated by those skilled in the art. Amplify signal 570 is shown connecting to left speaker jack 632 so that the audio signal travels along common path 725 before reaching cavity contacts 405. In this way, the test signal would not only test cavity contacts 405 but would also test internal conductors between left speaker jack 632 and cavity contacts 405. In this respect, a user pressing left test button 515 would test multimedia monitor 100 from the input source of the signal to the cavities used to connect to left speaker 210 (not shown). In an alternative embodiment, amplify signal 570 could be connected directly to cavity contacts 405 without to travelling over common path 725. However, in this embodiment, shorts or opens along common path 725 could not be as easily ascertained because the audio signal would not travel over common path 725. As shown in FIG. 7, the circuitry to provide the audio test signal to right contacts 405 would be substantially the same as those used to provide the audio test signal to left contacts.

Figure 8:
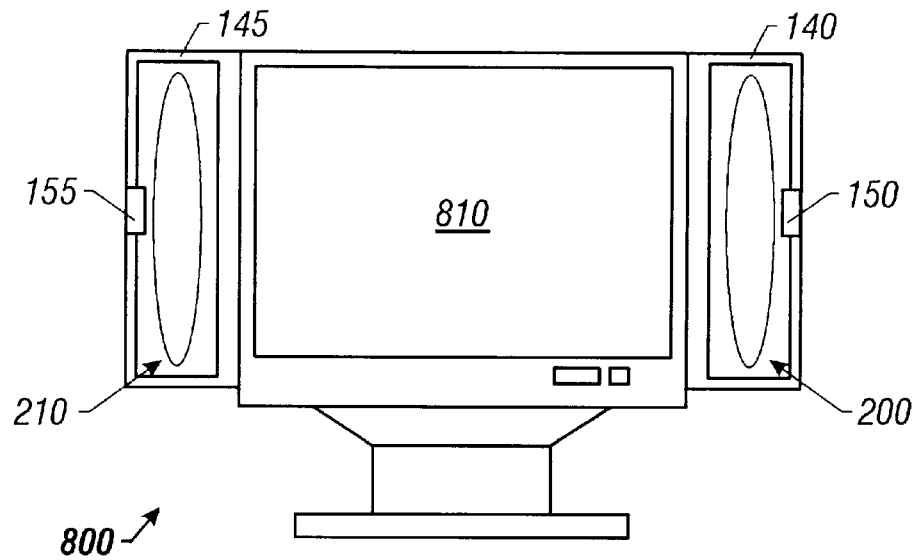
FIG. 8 is a front view of a flat panel display with speakers.

Turning to FIG. 8, this figure shows a flat panel display 800 with left speaker 210 and right speaker 200 inserted into the flat panel display with flat panel display screen 810 between the left and right speakers. Left speaker 210 and right speaker 200 are analogous to the speakers shown inserted in multimedia monitor 100 in FIG. 2. Likewise, left speaker 210 and right speaker 200 are insertable into left cavity frame 145 and right cavity frame 140, respectively. Also, left speaker 210 and right speaker 200 are kept within the respective cavity frames by left latch 155 and right latch 150.

Figure 9:
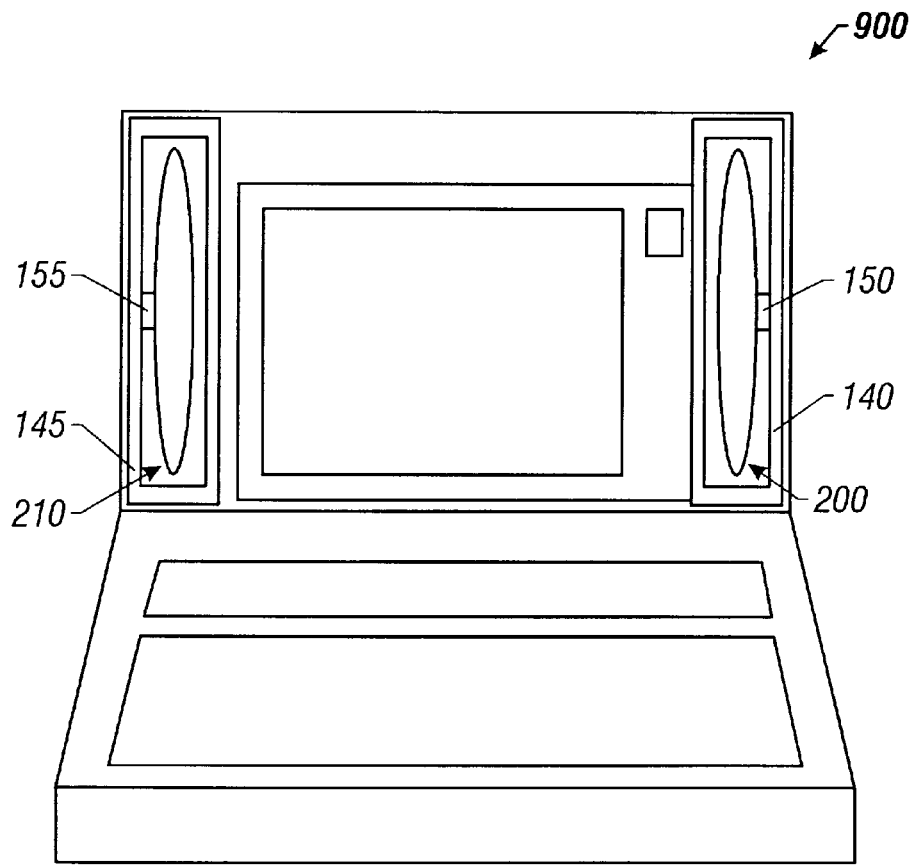
FIG. 9 is a front view of a notebook computer display with speakers.

Turning to FIG. 9, this figure shows a notebook computer system 900 with left speaker 210 and right speaker 200 inserted on either side of the notebook computer display screen. Similarly to speakers shown FIG. 2 and FIG. 8, left speaker 210 and right speaker 200 are insertable into left cavity frame 145 and right cavity frame 140, respectively. Also, left speaker 210 and right speaker 200 are kept within the respective cavity frames by left latch 155 and right latch 150.

What is claimed is:

1. A computer system comprising:
    a computer system unit including:
        a processor;
    a multimedia computer monitor electrically connectable to the computer system unit with one or more cables, the multimedia computer monitor including:
        a display screen;
        an outer shell of the multimedia computer monitor encasing the display screen and forming a first cavity and a second cavity;
        a first plurality of contacts housed within the first cavity;
        a second plurality of contacts housed within the second cavity;
        a first speaker including a plurality of first speaker contacts for electrically connecting the first speaker to either the first plurality of contacts or the second plurality of contacts;
        a second speaker including a plurality of second speaker contacts for electrically connecting the second speaker to either the first plurality of contacts or the second plurality of contacts;
        a first latch for physically engaging and securing either the first or second speaker within the first cavity, the first latch being operable for removing either the first or second speaker from the first cavity;
        a second latch for physically engaging and securing either the first or second speaker within the second cavity, the first latch being operable for removing either the first or second speaker from the second cavity;
        a first test button that is operable to generate a first test signal that is transmitted to the first plurality of contacts activating the speaker connected to the first plurality of contacts to generate a first audible response;
        a second test button that is operable to generate a second test signal that is transmitted to the second plurality of contacts activating the speaker connected to the second plurality of contacts to generate a second audible response;
        wherein the first and second speakers are interchangeable between the first and second cavities.

2. The computer system, as recited in claim 1, said computer system further comprising:
    a common signal path, wherein the common signal path is adapted to conduct signals from the computer system unit, and wherein the first and second test signals are transmitted within the multimedia computer monitor over the common signal path.

3. A computer system, as recited in claim 1, wherein the multimedia computer monitor includes a flat-panel display.

4. A computer system, as recited in claim 1, wherein the multimedia computer monitor includes a notebook computer display.

5. A computer system, as recited in claim 1, said computer system further comprising:
    the first and second speakers each having an outer form, wherein the outer form includes a curved surface for directing sound towards a user.

6. A multimedia computer monitor, said multimedia computer monitor comprising:
    a display screen;
    an outer shell, wherein the outer shell forms a first cavity and a second cavity;
    a first plurality of contacts, wherein the first plurality of contacts are housed within the first cavity;
    a first speaker, wherein the first speaker is electrically connected to the first plurality of contacts, and wherein the first speaker is housed within the first cavity;
    a second plurality of contacts, wherein the second plurality of contacts are housed within the second cavity;
    a second speaker, wherein the second speaker is electrically connected to the second plurality of contacts, and wherein the second speaker is housed within the second cavity; and
    wherein the first and the second speakers are removable and interchangeable between the first and second cavities.

7. A multimedia computer monitor, as recited in claim 6, said multimedia computer monitor further comprising:
    a first test button and a second test button, wherein each of the first and second test buttons are formed within the outer shell of the multimedia computer monitor, a first test signal, wherein the first test signal is transmitted to the first plurality of contacts in response to a user pressing the first test button, and a second test signal, wherein the second test signal is transmitted to the second plurality of contacts in response to the user pressing the second test button.

8. A multimedia computer monitor, as recited in claim 7, said multimedia computer monitor further comprising:

a first audible response, wherein the first audible response is generated by the first speaker in response to the first speaker receiving the first test signal; and a second audible response, wherein the second audible response is generated by the second speaker in response to the second speaker receiving the second test signal.

9. A multimedia computer monitor, as recited in claim 7, said multimedia computer monitor further comprising:

a common signal path, wherein the common signal path is adapted to conduct signals from the computer system unit, and wherein the first and second test signals are transmitted within the multimedia computer monitor over the common signal path.

10. A multimedia computer monitor, as recited in claim 6, said multimedia computer monitor further comprising:

a first plurality of speaker contacts on the first speaker, wherein the first plurality of speaker contacts touch the first plurality of contacts when the first speaker is placed in the first speaker cavity, and wherein the first plurality of speaker contacts touch the second plurality of contacts when the first speaker is placed in the second speaker cavity.

11. A multimedia computer monitor, as recited in claim 6, said multimedia computer monitor further comprising:

a first latch for physically engaging and securing the first speaker within the first cavity;

a second latch for physically engaging and securing the second speaker within the second cavity.

12. A multimedia computer monitor, as recited in claim 6, wherein the multimedia computer monitor includes a flat-panel display.

13. A multimedia computer monitor, as recited in claim 6, wherein the multimedia computer monitor includes a notebook computer display.

14. A multimedia computer monitor, as recited in claim 6, said multimedia computer monitor further comprising:

the second speaker and first speaker each having an outer form, wherein the outer form includes a curved surface for directing sound towards a user.

15. A multimedia computer monitor comprising:

an outer shell, wherein the outer shell forms one or more cavities;

a display, wherein the display resides in one of the one or more cavities;

one or more speakers, wherein the one or more speakers are electrically connected to the multimedia computer monitor; and one or more speaker test buttons formed within the outer shell, wherein the one or more speaker test buttons responsively transmit a test signal to the one or more speakers.

16. A multimedia computer monitor, as recited in claim 15, said multimedia computer monitor further comprising:

a first speaker of the one or more speakers, wherein the first speaker resides in one of the one or more cavities; and a second speaker of the one or more speakers, wherein the second speaker resides in one of the one or more cavities, and wherein the first and second speakers are interchangeable between their respective cavities.

17. A multimedia computer monitor, as recited in claim 16, said multimedia computer monitor further comprising:

the second speaker and first speaker each having an outer form, wherein the outer form includes a curved surface for directing sound towards a user.

18. A multimedia computer monitor, as recited in claim 15, said multimedia computer monitor further comprising:

a common signal path, wherein the common signal path is adapted to conduct signals from the computer system unit, and wherein the test signal is transmitted within the multimedia computer monitor over the common signal path.

19. A multimedia computer monitor, as recited in claim 15, wherein the multimedia computer monitor includes a flat-panel display.

20. A multimedia computer monitor, as recited in claim 15, wherein the multimedia computer monitor includes a notebook computer display.

\* \* \* \* \*